United States Patent Office 3,562,350
Patented Feb. 9, 1971

3,562,350
PROCESS FOR MANUFACTURING CONJUGATED DIOLEFINS FROM ALKYL-1,3-DIOXANES
Bernard Juguin, Rueil Malmaison, and Bernard Torck, Chatou, France, assignors to Institut Francais du Petrole des Carburants et Lubrifiants, Rueil Malmaison, Hauts-de-Seine, France
No Drawing. Filed Dec. 12, 1968, Ser. No. 783,436
Claims priority, application France, Dec. 13, 1967, 132,357
Int. Cl. C07c 1/20; B01j 11/83
U.S. Cl. 260—681                                               11 Claims

ABSTRACT OF THE DISCLOSURE

A process for manufacturing conjugated diolefins from an alkyl-1,3-dioxane which comprises passing said dioxane, at a temperature of about 250 to 500° C., over a catalyst comprising a compound of an element selected from Groups II–A and II–B of the Periodic Table and a precursor of phosphoric anhydride deposited on a silica carrier, the Group II–A and Group II–B element, expressed as the oxide, being present in an amount of about 2 to 20% by weight, based on the total catalyst and the phosphoric anhydride precursor, expressed as $P_2O_5$, being present in an amount of about 2 to 20% by weight, based on the total catalyst, the molar ratio of $P_2O_5$ to the Groups II–A and II–B metal oxide being about 0.1 to 0.6, said process being conducted in the present of a steam diluent having a phosphoric acid content of about 0.001 to 0.1% by weight, expressed as $P_2O_5$, the ratio by volume of water to the dioxane, calculated in the liquid state being about 0.1 to 15, and recovering the conjugated diolefins.

---

This invention relates to an improved process for manufacturing conjugated diolefins by catalytic decomposition of mono- or dialkyl-1,3-dioxanes, and more particularly to a catalyst and to a process for manufacturing isoprene from 4,4-dimethyl-1,3-dioxane according to the equation:

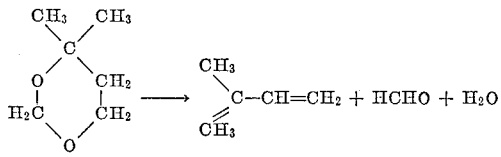

This reaction is the final object of the invention and is generally accompanied with secondary reactions the most important of which leads to the formation of isobutene.

It is well known that isoprene is a very important monomer for the manufacture of synthetic rubber, whose demand is presently increasing so that it appeared necessary to improve its conditions of manufacture so as to make it easier and more economical.

There are already known various catalysts for carrying out the conversion of dioxanes to diolefins, these catalysts consisting, in most cases, of metal phosphates or phosphoric acid deposited on a carrier. The known catalysts suffer from one or more of the following deficiencies: low activity, insufficient selectivity, poor mechanical strength, lack of stability with time and/or incomplete restoration of the initial performances during the regeneration stages.

The main object of the invention is to provide a catalyst which is simultaneously active, selective, stable and very resistant both to crushing and attrition, so as to be capable of being used as well in a stationary bed or in a moving bed. Such a catalyst can be easily regenerated.

The improved process of this invention is essentially characterized in that a mono or polyalkylmetadioxane, more particularly 4,4-dimethyl-1,3-dioxane (DMD) preferably with a diluent such as steam, nitrogen, carbon monoxide or carbon dioxide, is passed over a catalyst obtained by depositing on a carrier of silica having a specific surface between 20 and 60 m.$^2$/g., an oxide or a precursor of an oxide of a metal selected from Groups II–A or II–B, such as magnesium, calcium, strontium, barium, zinc or cadmium, and a precursor of phosphoric anhydride ($P_2O_5$), this treatment being followed with a calcination at a temperature in the range of from 500 to 1200° C., preferably from 800 to 1000° C.

According to a preferred way of carrying out the invention, the carrier is formed of activated silica having a degree of purity higher than 95% and a porous volume between 0.5 and 1.4 cc./g., at least 80% of this porous volume corresponding to pores of an average diameter between 100 and 500 angstroms. The diluent is not necessary but its use is of interest inasmuch as it provides for the calories required in the reaction.

The compounds from Groups II–A or II–B will be used in a proportion by weight (expressed as oxide) advantageously between 2 and 20% and the precursors of $P_2O_5$ in a proportion by weight (expressed as $P_2O_5$) also between 2 and 20%.

These proportions are given with respect to the total catalyst.

It is however preferred to make use of $P_2O_5$ and MO in a relative molar ratio between 0.1 and 0.6, particularly between 0.2 and 0.4, M being the metal from Group II.

The active elements are deposited on silica by means of the solutions containing them or capable of liberating these oxides when they are decomposed, for example the aqueous solutions of barium, magnesium, calcium, strontium, zinc or cadmium nitrate, acetate, citrate, tartrate, laurate or lactate; the aqueous solutions of ortho-, pyro-, meta- or polyphosphoric acids may be used as precursors of phosphoric anhydride.

In the case of the synthesis of isoprene from 4,4-dimethyl-1,3-dioxane (DMD), the best catalysts have been obtained by the following successive steps:

(1) Impregnation of silica by means of a solution containing a precursor of an oxide of a metal from Groups II–A or II–B, or, as well a mixture of these precursors.

(2) Partial drying, for instance between 60 and 110° C.

(3) Calcination between 200 and 700° C. for 0.5 to 6 hours while passing a gaseous stream, for instance a stream of air or an inert gas.

(4) Impregnation by a solution of ortho, pyro, meta or polyphosphoric acids.

(5) Drying, for instance at about 100–150° C.

(6) Calcination, for instance by heating for 0.5 to 5 hours in an air stream at a temperature of about 500 to 1,200° C., preferably 800 to 1,000° C. The conditions of use of these catalysts are critical. In order to obtain particularly high conversions and selectivities in isoprene, the reaction temperature will be chosen between 250 and 500° C., preferably between 350 and 450° C., with hourly feeding rates by volume of liquid dioxane (VVH) of about 0.2 to 3 times and advantageously 0.5 to 2 times the volume of the catalyst, with absolute pressures between 0.5 and 10 kg./cm.$^2$ and preferably between 1 and 3 kg./cm.$^2$. The partial pressure of steam, used as the preferred diluent, having a substantial effect on the selectivity and the stability of these catalysts, the ratio by volume liquid water/liquid dioxane at the inlet of the reactor will be advantageously between 0.1 and 15, particularly between 0.5 and 5 and preferably between 1 and 2. In order to maintain a high activity over a very long period it will be also advantageous to inject very small amounts of $P_2O_5$, for instance in the form of ortho, pyro or metaphosphoric acids, in the current of steam, the $P_2O_5$ content by weight of steam being, in such a case, advantageously between 0.001 and 0.1%.

As preferred dioxanes are to be mentioned the 4,4-dimethyl-1,3-dioxane and the 4,5-dimethyl-1,3-dioxane leading to isoprene and the 4-methyl-1,3-dioxane leading to butadiene.

The following nonlimitative examples will further illustrate the invention:

EXAMPLE 1

100 g. of extruded silica of a 98% purity, having a total porous volume of 1.2 cc./g. and a specific surface of 35 m.$^2$/g., 92% of said porous volume corresponding to pores of a diameter between 100 and 500 angstroms, are impregnated with 120 cc. of an aqueous solution containing 33.3 g. of calcium acetate. The contact with this solution is maintained for 3 hours. After these 3 hours the extruded silica has completely absorbed the solution. It is thereafter dried in an oven at 100° C. for 4 hours and then calcinated for 1 hour at 250° C. in an air stream. After calcination, the extruded silica is again impregnated with 110 cc. of an aqueous solution containing 11.8 cc. of orthophosphoric acid having a density of 1.71 and a $P_2O_5$ content by weight of 1,076 g./liter. The contact is maintained for 6 hours and followed with a drying stage in an oven at 100° C. for 4 hours. The catalyst is then calcinated for one hour at 900° C. in an air stream. After calcination the specific surface of the catalyst was 13 m.$^2$/g. and its average crushing strength was 27 kg./cm.$^2$. The catalyst contains by weight 9.7% of CaO and 7.6% of $P_2O_5$.

The catalyst has been thereafter placed in a reactor of steel having a length of 40 cm. and an internal diameter of 2.5 cm. Over this catalyst are passed 4,4-dimethyl-1,3-dioxane and water, with the following operating conditions:

temperature—380° C.
absolute pressure—1.5 kg./cm.$^2$
hourly feeding rate of liquid DMD—1 volume per volume of catalyst per hour.
hourly feeding rate of liquid water—1.5 volume per volume of catalyst per hour.
$H_3PO_4$ content of water by weight—0.01%.

Under these conditions the initial conversion rate was 95% with selectivities of 75% in isoprene and 20% in isobutene respectively. The selectivity in formaldehyde, expressed in moles of formaldehyde per 100 moles of DMD, was 120%. This figure, higher than 100 is due to the secondary reaction of isobutene formation which provides 2 moles of formaldehyde per mole of DMD. After operating for 6 hours, these figures were respectively 93%, 71%, 23% and 125%. The catalyst was then regenerated by means of an air-steam mixture having a 0.01% $H_3PO_4$ content, at a temperature of 420° C. for one hour.

After regeneration the conversion rate was 97% and the selectivities in isoprene, isobutene and formaldehyde were respectively 84%, 12% and 112%. After 6 hours these figures were respectively 96%, 81%, 15% and 117%. After 3 cycles of operation with the same operating conditions (6 hours of reaction and 1 hour of regeneration) the average conversion rate during the third run was 98% and the average selectivities in isoprene, isobutene and formaldehyde were 83%, 14% and 116% respectively. Of course a high selectivity in the production of isoprene is of interest since isoprene is the desired product but nevertheless a high selectivity in formaldehyde is valuable since formaldehyde can be advantageously recycled to the preceding stage of dioxane synthesis.

EXAMPLE 2

100 g. of extruded silica, exhibiting the same textural characteristics as that of Example 1, are impregnated with 120 cc. of an aqueous solution containing 34.6 g. of calcium nitrate. The contact is maintained for 3 hours and the resulting impregnated alumina is then dried in an oven at 100° C. for 4 hours. The extruded alumina is then calcinated at 480° C. for 2 hours in an air stream, and thereafter impregnated again with 110 cc. of a solution containing 11.8 cc. of orthophosphoric acid having a density of 1.71. The contact is maintained for 6 hours and then a drying is carried out at 100° C. for 4 hours in an oven. The resulting catalyst is then calcinated at 900° C. for one hour in an air stream. After calcination the specific surface of this catalyst was 11 m.$^2$/g. and its average crushing strength 25 kg./cm.$^2$. It has the same composition as the catalyst of Example 1.

A mixture of DMD and water was passed over this catalyst under the same operating conditions as in Example 1; the initial conversion rate was 93% and the selectivities in isoprene and formol respectively 70% and 126%. After 6 hours of operation the figures were respectively 89%, 65% and 130%.

The catalyst was then regenerated by use of an air-steam mixture under the operating conditions set forth in Example 1; after regeneration the conversion rate was 95% and the selectivities in isoprene and formaldehyde respectively 77% and 120%. After 15 runs (6 hours of reaction and one hour of regeneration at each run), the average conversion rate during the fifteenth run was 96% and the average selectivities in isoprene and formaldehyde respectively 78% and 121%.

EXAMPLE 3

There is prepared a catalyst, under the same conditions as in Examples 1 or 2, starting from calcium citrate, so that the catalyst content in active elements be the same as in Examples 1 or 2.

After calcination, the specific surface of this catalyst was 14 m.$^2$/g. and its average crushing strength 29 kg./cm$^2$. A mixture water-DMD is pased over this catalyst under the same operating conditions as in Example 1; the initial conversion rate was 96% with selectivities in isoprene and formaldehyde of respectively 17% and 120%. After six hours of operation, these figures were respectively 94%, 74% and 122%. After regeneration by means of an air-steam mixture under the conditions of Example 1, the conversion rate was 98% and the selectivities in isoprene and formaldehyde 86% and 113%. After 15 runs under the same conditions, the average conversion rate (during the 15th run) was 97% and the selectivities in isoprene and formaldehyde 85% and 115% respectively.

EXAMPLE 4

Using the same operating technique and the same extruded silica as in Example 1, there are prepared three catalysts A, B and C, starting from calcium acetate. After depositing $P_2O_5$, the three catalysts were calcinated for one hour, respectively at 700° C., 900° C. and 1,100° C. The results of tests carried out under the operating conditions of Example 1, are given in Table I hereunder.

These catalysts have the same contents in active elements as according to the preceding examples. Catalysts B is identical in all points to that of Example 1.

TABLE I

| | Calcination temperature, °C. | Initial performances | | Performances after 5 runs | | Performances after 15 runs | |
|---|---|---|---|---|---|---|---|
| | | Conversion, percent | Isoprene selectivity, percent | Conversion, percent | Isoprene selectivity, percent | Conversion, percent | Isoprene selectivity, percent |
| Catalyst: | | | | | | | |
| A | 700 | 98 | 67 | 98 | 63 | 98 | 58 |
| B | 900 | 95 | 75 | 98 | 83 | 98 | 83 |
| C | 1,100 | 87 | 66 | 89 | 66 | 89 | 65 |

The calcination temperature thus has an obvious effect on the activity and the selectivity of these catalysts, the optimum temperature being bewteen 800° C. and 1,000° C.

EXAMPLE 5

By use of the same operating technique as in Example 1 and starting from calcium acetate, there are prepared three catalysts D, E and F, by impregnating extruded silica carriers of different specific surfaces, D:150 m.²/g. E:35 m.²/g.—F:10 m.²/g.

After $P_2O_5$ has been deposited the three catalysts have been calcinated for one hour at 900° C.; after calcination their respective specific surfaces were 45 m.²/g., 13 m.²/g. and 1 m.²/g. When subjected to the same test as according to Example 1, the performance of these three catalysts are those shown in Table II. The proportions of active elements remain, of course, unchanged as compared to the preceding examples.

TABLE II

| | Specific surface (m.²/g.) | | Initial performances | | Performances after 5 runs | | Performances after 15 runs | |
|---|---|---|---|---|---|---|---|---|
| | Catalyst | Carrier | Conversion, percent | Isoprene selectivity, percent | Conversion, percent | Isoprene selectivity, percent | Conversion, percent | Isoprene selectivity, percent |
| Catalyst: | | | | | | | | |
| D | 45 | 150 | 98 | 68 | 98 | 65 | 98 | 61 |
| E | 13 | 35 | 95 | 75 | 98 | 83 | 98 | 83 |
| F | 1 | 10 | 82 | 67 | 85 | 69 | 86 | 70 |

Also the specific surface of the catalyst has accordingly a very significant effect on the activity and particularly on the selectivity of these catalysts; the best results are obtained with specific surfaces of about 10 to 15 m.²/g. which corresponds to carrier surfaces of about 20 to 60 m.²/g.

EXAMPLES 6 TO 9

Still using the same technique and the same extruded silica as in Example 1, there is prepared a catalyst where calcium acetate is replaced by the same molar amount of other salts. Under the operating conditions of Example 1, the following results were obtained after 15 runs:

| Salt | Percent conversion | Isoprene selectivity, percent | Formaldehyde selectivity, percent |
|---|---|---|---|
| Barium acetate | 93 | 66 | 128 |
| Strontium acetate | 94 | 67 | 127 |
| Cadmium acetate | 93 | 70 | 125 |
| Zinc acetate | 96 | 62 | 132 |

What is claimed as this invention is:

1. A process for manufacturing conjugated diolefins from an alkyl-1,3-dioxane which comprises passing said dioxane, at a temperature of about 250 to 500° C., over a catalyst comprising a compound of an element selected from Groups II–A and II–B of the Periodic Table and a precursor of phosphoric anhydride deposited on a silica carrier, the Group II–A and Group II–B element, expressed as the oxide being present in an amount of about 2 to 20% by weight, based on the total catalyst and the phosphoric anhydride precursor, expressed as $P_2O_5$, being present in an amount of about 2 to 20% by weight, based on the total catalyst, the molar ratio of $P_2O_5$ to the Groups II–A and II–B metal oxide being about 0.1 to 0.6, said process being conducted in the presence of a steam diluent having a phosphoric acid content of about 0.001 to 0.1% by weight, expressed as $P_2O_5$, the ratio by volume of water to the dioxane, calculated in the liquid state being about 0.1 to 0.15, and recovering the conjugated diolefins.

2. A process according to claim 1 wherein the silica is activated silica with a purity degree of at least 95%.

3. A process according to claim 2 wherein the silica has a porous volume between 0.5 and 1.4 cc./g., at least 80% of said porous volume corresponding to pores of a diameter between 100 and 500 angstroms.

4. The process of claim 1, wherein the silica carrier has a specific surface of about 20 to 60 m.²/g.

5. A process according to claim 1 wherein the catalyst is heated, during its manufacture between 800 and 1,000° C.

6. A process according to claim 1 wherein the compound of an element from Groups II–A and II–B is selected from the group consisting of nitrates, acetates, tertrates, citrates, laurates and lactates.

7. The process of claim 1, wherein the hourly feeding rate, by volume, of the liquid dioxane is about 0.2 to 3 times the volume of the catalyst.

8. A process according to claim 1 wherein the dioxane is treated under a pressure between 0.5 and 10 kg./cm.².

9. The process of claim 1, wherein the dioxane is selected from the group consisting of 4,4-dimethyl-1,3-dioxane, 4,5-dimethyl-1,3-dioxane and 4-methyl-1,3-dioxane.

10. The process of claim 1, wherein the precursor of phosphoric anhydride is selected from the group consisting of ortho-, pyro-, meta- and polyphosphoric acid.

11. A process for manufacturing conjugated diolefins from an alkyl-1,3-dioxane which comprises passing said dioxane, at a temperature of about 250 to 500° C. over a catalyst obtained by successively depositing on a silica carrier having a specific surface of about 20 to 60 m.²/g., a compound of an element selected from the Groups II–A and II–B of the Periodic Table and a precursor of phosphoric anhydride, the Group II–A and Group II–B element, expressed as the oxide, being present in an amount of about 2 to 20% by weight, based on the total catalyst and the phosphoric anhydride precursor, expressed as $P_2O_5$, being present in an amount of about 2 to 20% by weight, based on the total catalyst, the molar ratio of $P_2O_5$ to the Group II–A and II–B metal oxide being about 0.2 to 0.4, said depositing being followed with a heat treatment at a temperature of about 500 to 1200° C., said process being conducted in the presence of steam having a phosphoric acid content of about 0.001 to 0.1% by weight, expressed as $P_2O_5$, the ratio by volume of water to the dioxane, calculated in the liquid state being about 0.1 to 15, and recovering the conjugated diolefins.

References Cited

UNITED STATES PATENTS

| | | | |
|---|---|---|---|
| 1,841,055 | 1/1932 | Reppe et al. | 260—681 |
| 2,218,640 | 10/1940 | Friedrichsen | 260—681 |
| 2,241,777 | 5/1941 | Friedrichsen | 260—681 |
| 2,361,539 | 10/1944 | Friedrichsen | 260—681 |
| 3,221,075 | 11/1965 | Hamamoto et al. | 260—681 |
| 3,437,711 | 4/1969 | Yanagita et al. | 260—681 |
| 2,977,396 | 3/1961 | Stanley et al. | 260—681 |

DELBERT E. GANTZ, Primary Examiner

G. E. SCHMITKONS, Assistant Examiner

U.S. Cl. X.R.

252—435